US008161533B2

(12) United States Patent  (10) Patent No.: US 8,161,533 B2
Baumeister et al.  (45) Date of Patent: Apr. 17, 2012

(54) JUST-IN-TIME AUTHENTICATION OF USERS OF A DIGITAL HOME NETWORK

(75) Inventors: Markus Baumeister, Aachen (DE); Steffen Hauptmann, Aachen (DE); Karin Klabunde, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 2084 days.

(21) Appl. No.: 10/131,967

(22) Filed: Apr. 25, 2002

(65) Prior Publication Data

US 2002/0178359 A1    Nov. 28, 2002

(30) Foreign Application Priority Data

Apr. 26, 2001 (DE) .................................. 101 20 364

(51) Int. Cl.
 *H04L 29/06* (2006.01)
(52) U.S. Cl. ............. 726/6; 726/2; 726/3; 726/4; 726/5; 713/168; 709/223; 709/225
(58) Field of Classification Search ........................ None
 See application file for complete search history.

(56) References Cited

U.S. PATENT DOCUMENTS

| | | | | |
|---|---|---|---|---|
| 5,553,239 A | * | 9/1996 | Heath et al. ...................... | 726/2 |
| 5,793,951 A | * | 8/1998 | Stein et al. ...................... | 726/5 |
| 6,205,480 B1 | * | 3/2001 | Broadhurst et al. ........... | 709/225 |
| 6,374,145 B1 | * | 4/2002 | Lignoul ........................... | 700/17 |
| 6,735,695 B1 | * | 5/2004 | Gopalakrishnan et al. ... | 713/186 |
| 6,892,307 B1 | * | 5/2005 | Wood et al. ........................ | 726/8 |
| 7,024,556 B1 | * | 4/2006 | Hadjinikitas et al. .......... | 713/168 |
| 2002/0104091 A1 | * | 8/2002 | Prabhu et al. ..................... | 725/80 |

FOREIGN PATENT DOCUMENTS

| | | | |
|---|---|---|---|
| EP | 1089516 A2 | * | 4/2001 |
| JP | 2000347970 | | 12/2000 |
| WO | WO0111450 | | 2/2001 |

OTHER PUBLICATIONS http://www.havi.org/about/aboutoverview.asp, p1-4, last visited: Nov. 29, 2005, copyright: 1999.*
Ralf Steinmetz (ED), "Kommunikation in Verteilten Systeme (Kivs)", 11$^{th}$ ITG/G1 Seminar, Darmstadt, Mar. 2-5, 1999, Stephan Abramowski et al, "Digitale Netzr in Wohnungen-Unterhaltungselektronik Im Umbruch", pp. 340-351.
Suzuki et al: "An Authentication Technique Based on Distributed Security Management Distributed Security Management for the Global Mobility Network"; IEEE Journal on Selected Areas in Communications, vol. 15, No. 8, Oct. 1997, pp. 1608-1617.
Wiedmer et al: "Ubiquitous Computing and Jini: How to Secure Services in the Future"; Comtec, vol. 78, No. 10, pp. 5-9, 2000.

* cited by examiner

*Primary Examiner* — Ponnoreay Pich

(57) ABSTRACT

A network has network nodes and a software system distributed over the network nodes within which, on first access to an access-protected object of the system, an authentication of the user is provided. The authentication is valid at least for a further access to an access-protected object. The duration of the validity of the authentication is dependent on the duration of access to the access-protected object and/or on the context of the use of the system.

15 Claims, 2 Drawing Sheets

JUST-IN-TIME AUTHENTICATION OF USERS OF A DIGITAL HOME NETWORK

Figure 1:
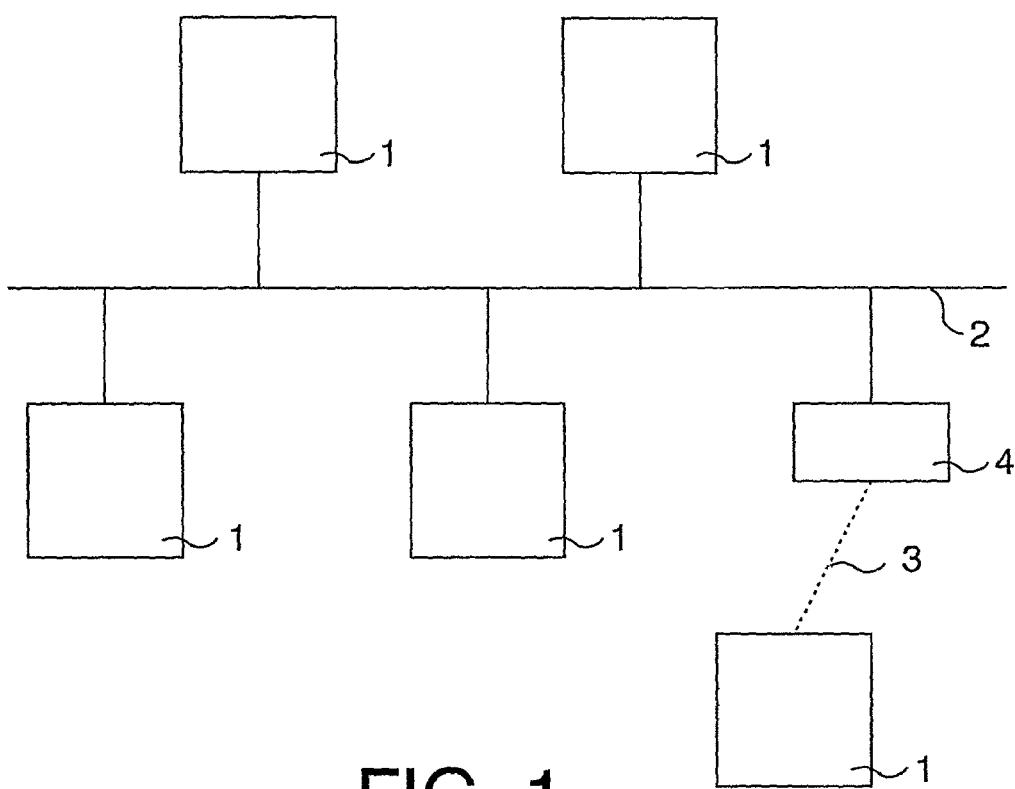

The invention relates to a network with network nodes and a software system distributed over all network nodes.

Such a network is known from Ralf Steinmetz (Ed.): "Kommunikation in verteilten Systeme (KiVS)", 11th ITG/GI seminar, Darmstadt, Mar. 2-5, 1999; Stephan Abramowski, Heribert Baldus, Tobias Helbig: "Digitale Netze in Wohnungen—Unterhaltungselektronik im Umbruch", pages 340 to 351. This publication describes requirements for a future network in the home sector with the software used therein. Existing methods for authentication within a network require authentication of the network users at the start of the use of the system. The validity of authentication remains in force until the end of the system use by a user. A further method already known is individual authentication. Here the authentication is required before each access of the user to the access-protected object. In this method the authentication loses its validity when the user has ended his access to the access-protected object. The use of existing methods to authenticate users within a home network is not known.

It is an object of the invention to create a network with a software system in which the authentication complexity for the user of a digital network is minimized and which simultaneously offers a high level of security.

The object is achieved by a network of the type described in the opening paragraph in that on first access to an access-protected object of the system an authentication of a user is provided, while the duration of validity of the authentication is dependent on the duration of access to the access-protected object and on the context of the use of the system.

Digital networks in the home sector allow communication and co-operation between independent devices. On the basis of a distributed operating system, objects of a home network can interact with each other without the knowledge of the fundamental communication technology. The home network is a network working according to the HAVi (Home Audio/Video Interoperability) standard.

To guarantee properties such as personalization or access rights, digital home networks require processes which can distinguish between the various users of the home network and verify their identity. The authentication methods available (e.g. user name and password, speaking a preset word sequence) may be extremely complex, time-consuming or awkward to the user. The number of necessary authentications must thus be restricted to a minimum. At the same time misuse of an existing authentication by third parties (e.g. after leaving the room) should be prevented as much as possible.

Within the digital home network some objects require protection against access by unauthorized or undesired users. Access-protected objects of the system can be for example apparatus, data, contents such as films, or applications. In addition, the user is able to personalize the system formed from the software and hardware of the home network according to his wishes and requirements. Personalization may mean that after the authentication by the user, the system selects a basic setting of certain apparatus and applications typical of the user, a list of the applications preferred by the user then appears on screen, or that the system behavior is user-dependent in case of resource conflicts (appliances, software programs, data etc.).

Both for securing access rights and for personalization it is necessary to identify the current active users of the system and verify their identity (authentication).

The method on which this invention is based requires authentication of the user on first access to a protected object and remains valid from this time on for a defined period. The defined period may be determined during system initialization or modified by the system administrator at a later time. The duration of the time period and hence the duration of validity of the authentication depends on the authentication mechanisms available. Context here is understood to mean the relevant content context or software environment applicable to the user during his use of the system.

In this way the complexity for the system user is restricted to a minimum and nonetheless a high level of security guaranteed as the authentication validity elapses if the user has been inactive for a long time (e.g. because he has left the room). With a corresponding choice of the validity period of an authentication, the user can be spared the effort of (explicitly) withdrawing his authentication, although this facility naturally also exists.

Each user of the home network has been allocated a data record, the user profile, which contains the user's preferences. The data necessary for authentication can also be contained in the user profile or in a database or be managed directly by the devices for authentication. The user profile is created after installation and before use of the system and can be modified at any time taking into account the relevant access rights to protected objects.

If a user begins with the access to the system, he need not authenticate himself at the start of the use of the system. If, however, the user would like his personal settings and access rights effective from the outset, he must authenticate himself from the start of the use of the system, i.e. retrieve the corresponding functions of the system for authentication.

If the user does not authenticate himself at the start of the use of the system, he can only use the system in a non-personalized manner. The non-personalized manner may mean that a list of his preferred applications cannot be shown to the user and the presettings for applications or devices cannot be taken into account. When the user accesses a protected object of the system, he is asked to authenticate himself e.g. by entering his user name and password, speaking a preset word sequence or by fingerprint. The authentication is performed by a software component of the system known as an authentication manager in co-operation with an authentication device. The authentication device can be for example a speech recognition device, a device fitted with corresponding sensors to recognize fingerprints, a camera or other devices.

Certain basic services such as television are available in unauthorized mode, although perhaps for example individual television channels cannot be retrieved (e.g. those which children should not see). Use of the system in unauthorized mode is also possible so that for example users not previously known to the system can use the basic system services.

If user authentication has been successful and the user identity has been authenticated within the system by comparison of the data entered by the user and the user data stored by the system, the user's access rights are checked using other software components and access granted or denied accordingly.

On successful authentication the user need not re-authenticate himself within the validity period of the authentication on further access to protected objects of the system. If authentication was not successful, the user can still use the system in limited manner (not personalized, no access to protected objects).

The duration of validity of the authentication depends on the duration of use and the context in which the user uses the system. In relation to the duration of validity of the authentication, a general context is distinguished from an application context. The general context relates to the actions at the system user interface e.g. the start of application or management programs. The application context is the context in which the actions take place within a particular application e.g. channel change during television viewing or recording (deleting, playing) of an audio diary.

If the user within the system begins access to an access-protected object, authentication is requested from him. If authentication is successful, it is valid both for the general context and for the application context, i.e. the user can perform all activities permitted for this user.

A timer serves as a clock to supply time information within the system. The timer is started at the time of authentication, and reset on every new interaction of the user with the system. The validity of authentication is thus maintained.

In the case where no further interaction of the user takes place during a predetermined time period of the timer, authentication elapses for the general context as soon as the timer run time has reached its limit value. Authentication is retained for the application context so that the user within the application can continue to perform all actions for which he has obtained access rights. In the general context he can now only perform actions provided for unauthorized users or the user must perform a further authentication.

The timer run time, or the time interval for which authentication remains valid in case of inactivity on the side of the user, is dependent on the authentication method used. If the system is speech controlled, the speech input can at the same time be used for speaker identification and hence the minimized run time of the timer, since the authentication is delivered together with each spoken word with associated properties of speech recognition.

In addition to deleting authentication on expiry of the timer, the user has the facility to expressly (explicitly) revoke his authentication.

Authentication can be explicitly arranged for by the system (e.g. on access attempt to a protected object) or by the user (e.g. by placing his finger on a fingerprint sensor), or can take place unnoticed by the user (implicitly) during a user input. Implicit authentication may be triggered for example by a camera with face recognition or by speech recognition or on input of a speech command.

A method of authenticating a user within a network with network nodes and a software system distributed over the network nodes requires for first access to a protected object of the system a user authentication where a duration of validity of the authentication is dependent on the duration of access to the protected object and the context of system use.

Figure 2A:
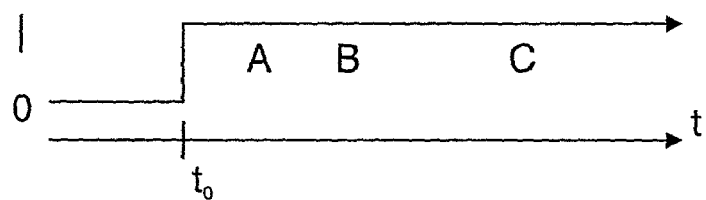
Figure 2B:
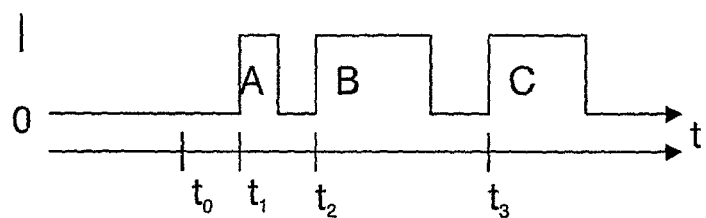
Figure 2C:
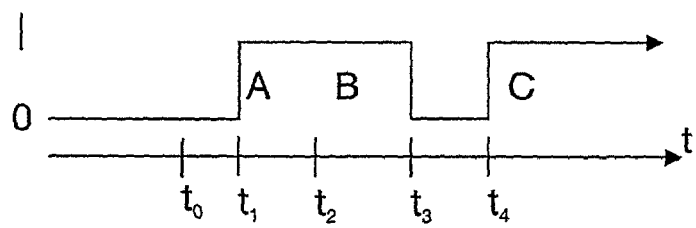
Figure 3:
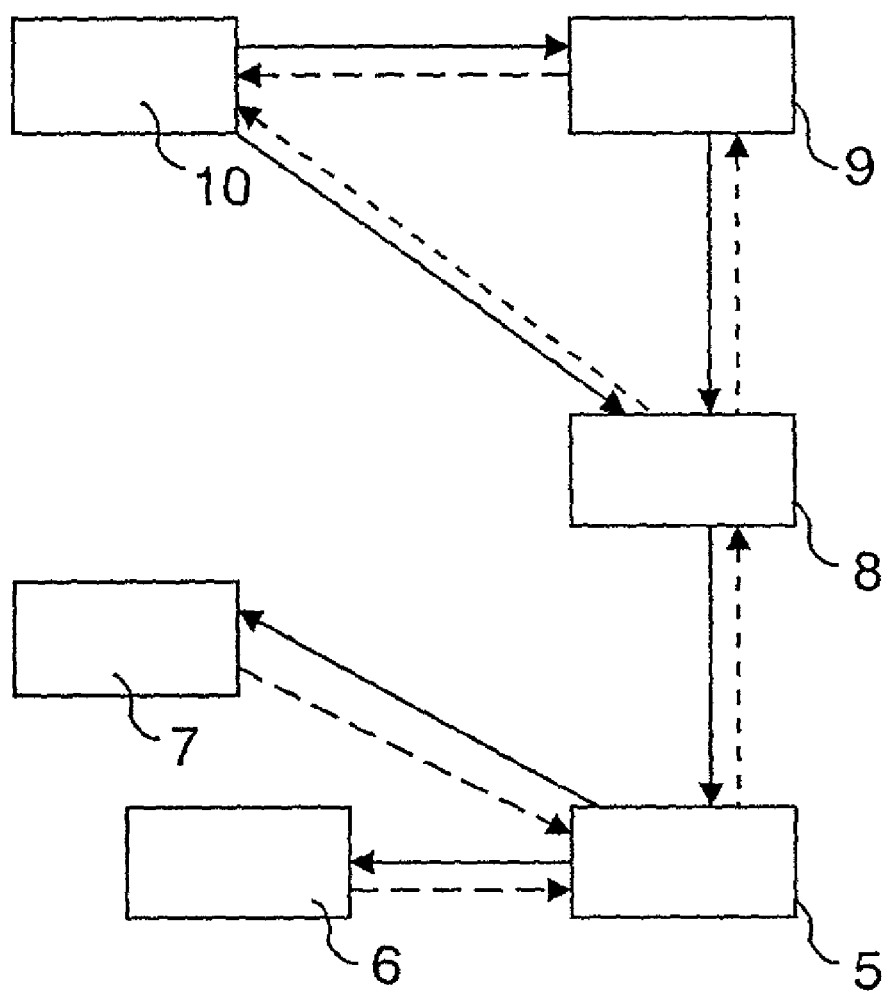

An embodiment of the invention is now described below using the Figures, in which:

FIG. 1 shows a network with various terminals,

FIGS. 2A to 2C give a representation of the different authentication strategies in time, FIG. 3 shows the software components relevant during the authentication operation.

FIG. 1 shows a home network which links together various terminals 1 via a bus system 2. The terminals 1 can also be coupled with the bus system 2 via a wireless connection 3 and a transceiver station 4. Here for example infrared or radio connections can be used. Such terminals can be PCs and devices of entertainment electronics such as television, set-top box, tuner, camera, digital video recorder, CD player.

A user starts a desired application in the home network at a terminal 1 using a software system distributed over all the terminals 1. It is assumed that the user wishes to make his entry in his audio diary. Thus the user begins using a system formed from software and hardware components of the home network, for which the user would like to use his personal presettings. As not every occupant of the house has access to the personal data of this user's audio diary, the user's identity must be verified within the system (authentication).

FIGS. 2A to 2C consist of three diagrams representing different authentication strategies within the home network. In this example shown the value 0 means that the user is not authenticated within the system i.e. the user has not authenticated himself via the available authentication method e.g. speaking a preset word sequence. The value l symbolizes the successful authentication of the user within the system. At time $t_0$ the user begins to use the system. At time $t_1$ the user accesses an access-protected object A and is consequently to authenticate himself within the system. During his period of system usage the user repeatedly accesses access-protected objects B and C which also require a check of his identity as they are protected from unauthorized access by a user or user group.

In FIG. 2A the authentication is required before the user begins to use the system and remains in force until the user finishes his use unless the user expressly revokes this.

The authentication strategy presented in FIG. 2B requires authentication at the time of access ($t_1$) to an access-protected object A and elapses at the end of access to this object. On further access at a later time $t_2$ to an object A which is also access-protected, the user must re-authenticate himself. This authentication loses its validity when access to object B has ended, so that at a later access ($t_3$) to an object C the user is asked for authentication for the third time during his use of the system.

FIG. 2C shows an authentication strategy which minimizes the user's authentication complexity. Authentication is requested not at the start of the use of the system but, as in 2B, on first access ($t_1$) to an access-protected object A. In contrast to the method presented in FIG. 2B, the validity of the user's authentication does not elapse at the end of access but remains in force until the next access by the user to an access-protected object B at time $t_2$.

If the user makes no further access or interactions during the validity period of the authentication after access to the protected object B, the authentication loses its validity at time $t_3$. If at a later time $t_4$ the user wishes to access an access-protected object C again (new application), he must identify himself again.

FIG. 3 shows the software components relevant for performing the authentication. Components of particular relevance to the performance of authentication are an authentication manager 5, an authentication function module 6 which represents the physical authentication device in software terms, and a database 7 in which the identification data for the individual users are stored. A software component known as an access rights manager 8 which checks access rights of the user to the desired object, a software component known as a resource manager 9 which manages resources such as devices, contents, useful data, administration data and applications, and a user interface 10, are required as further software components of the system for a clear representation of an authentication operation.

When the user accesses an application, the user interface 10 can check directly with the access rights manager 8 whether this user access is permitted. If use of the application is permitted, the interface next requests from the resource manager 9 reservation of the resources necessary for this application. This manager in its turn arranges a check of access rights with the access rights manager 8 to determine whether access to protected objects of the system is required.

If this is the case the access rights manager 8 requests authentication of the user from the authentication manager 5. Instead of the access rights manager 8, any components of the system can request authentication from the authentication manager 5.

After a respective request has reached the authentication manager 5, the latter selects and reserves the possible authentication devices which are represented by corresponding authentication function modules and asks them to begin authentication. A request for authentication is displayed on screen or output via a speaker. As soon as the authentication data entered by the user on the authentication device are available to the authentication function module, the authentication manager 5 requests comparison data from the database 7 for comparison purposes. A comparison operation on the data is performed and the result is either identification of the user or unsuccessful authentication. If the authentication was successful, a software component known as a timer starts to measure the time between two user interactions with the system, so that authentication can be revoked on expiry of the validity period.

The invention claimed is:

1. A network comprising:
   network nodes; and
   a system distributed over the network nodes within which, on first access to a first access-protected object of the system an authentication is provided,
   wherein the authentication is valid during a validity duration at least for allowing a further access to a second access-protected object including an application,
   wherein the validity duration is dependent on a duration of access to the first access-protected object and/or on context of use of the system, and
   wherein, after expiration of the validity duration, the authentication is maintained for actions within the application and is revoked for acts outside the application.

2. The network as claimed in claim 1, wherein on the first access to the first access-protected object, an authentication manager and an authentication device are provided to authenticate a user.

3. The network as claimed in claim 2, wherein after successful authentication, system use by the user is provided within a general context which allows actions at a system user interface and within an application context which allows actions within the application.

4. The network as claimed in claim 1, further comprising a timer which is configured to start after the authentication to determine time of system use by a user, wherein the timer is reset with every new user interaction with the system, and wherein validity of the authentication for a general context elapses after expiry of a run time of the timer.

5. The network as claimed in claim 4, wherein any value can be allocated to the run time of the timer on system installation.

6. The network as claimed in claim 3, wherein there is an explicit authentication arranged for use by the system or the user, or an implicit authentication during an interaction with the system.

7. The network as claimed in claim 1, wherein the network includes a home network according to the HAVi standard.

8. A method of authenticating a user within a network with network nodes and a system distributed over the network nodes, the method comprising:
   providing authentication of a user upon a first access by the user to an access-protected object of the system, the access-protected object including an application, wherein a duration of validity of the authentication is dependent on a duration of access to the system and on a context of use of the system; and
   after expiration of the validity duration, maintaining the authentication for actions within the application while revoking the authentication for acts outside the application.

9. The method of claim 8, wherein the context of use includes a general context which allows actions requiring authentication at a system user interface and an application context which allows actions within the application.

10. The method of claim 9, wherein after expiration of the validity duration, maintaining the authentication for actions within the application context initiated during the duration of validity, while revoking the authentication for acts outside the application context including the general context.

11. A security system comprising a computer and an authentication manager configured for causing the computer to:
    provide access rights to a first protected object and a second protected object upon authentication of a user having rights for access to said first protected object and said second protected object;
    revoke said access rights to said first protected object upon expiration of a time period; and
    maintain said access rights to said second protected object after said expiration of said time period.

12. The security system of claim 11, wherein said second protected object includes an application, said access rights being maintained for actions within said application and revoked for acts outside said application.

13. The security system of claim 12, wherein said application is related to accessing at least one of audio or video signals.

14. The security system of claim 11, wherein said computer is further configured to reset said time period upon detection of user activity related to said first protected object.

15. The security system of claim 11, wherein said computer is further configured to maintain said access rights to said first protected object during said time period after a user ends accessing said first protected object.

* * * * *